March 30, 1926.
W. K. HERBST ET AL
1,578,824
FLUID OPERATED BRAKE
Filed April 18, 1924     3 Sheets-Sheet 1
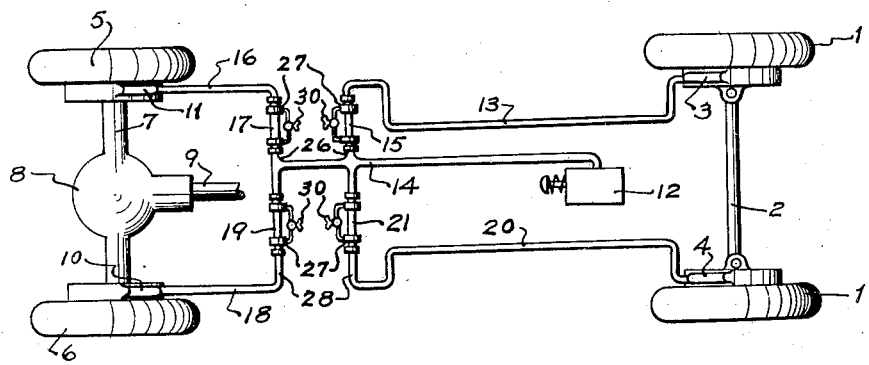
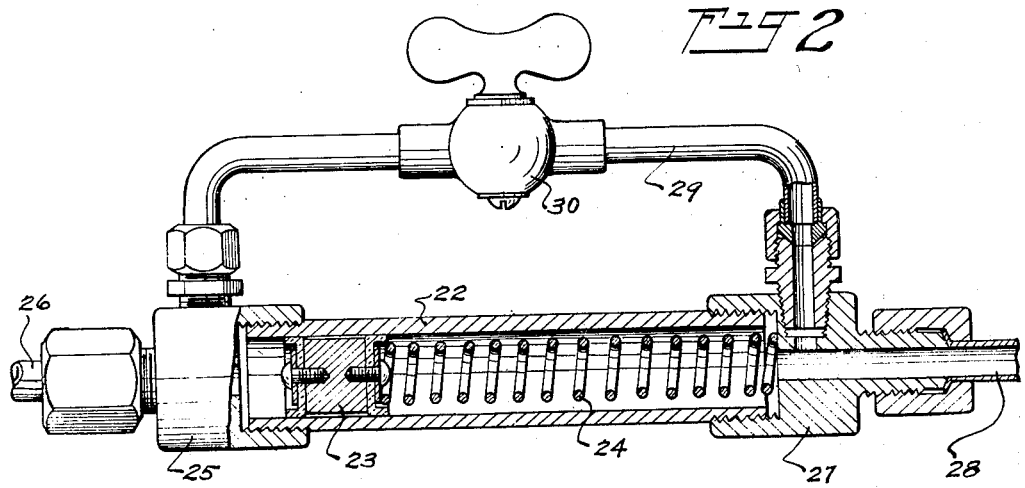
W. K. Herbst and
R. H. Stone      INVENTORS
BY
Thomas Howe  ATTORNEY

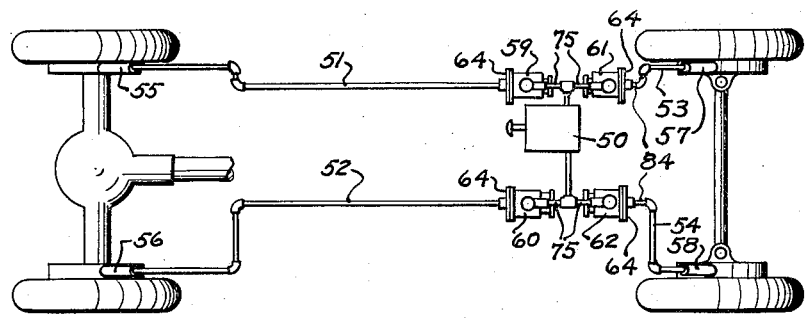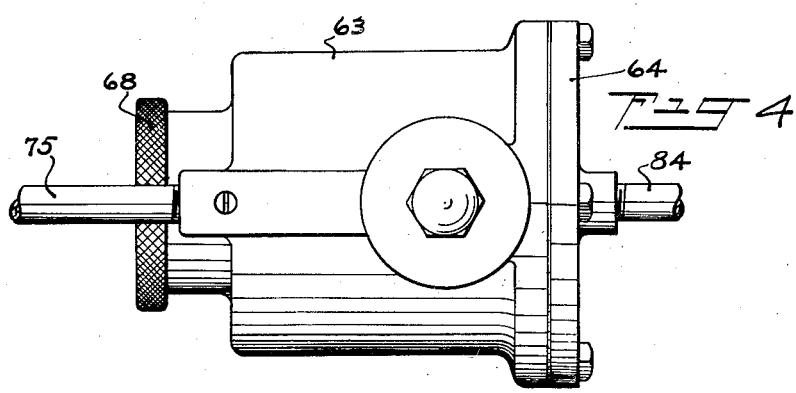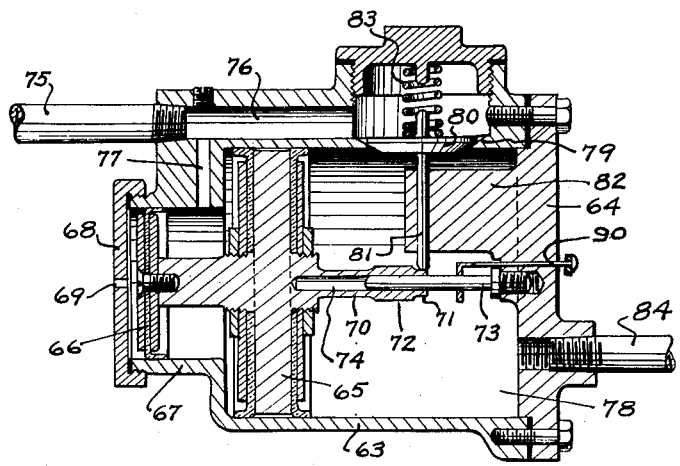

March 30, 1926.
W. K. HERBST ET AL
1,578,824
FLUID OPERATED BRAKE
Filed April 18, 1924   3 Sheets-Sheet 3
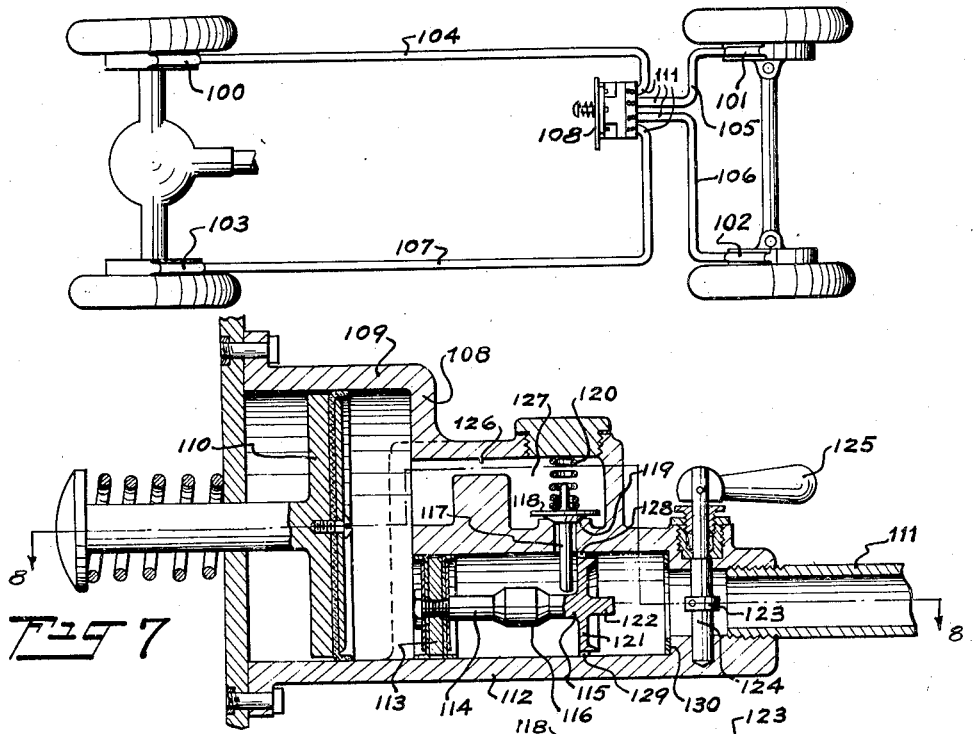
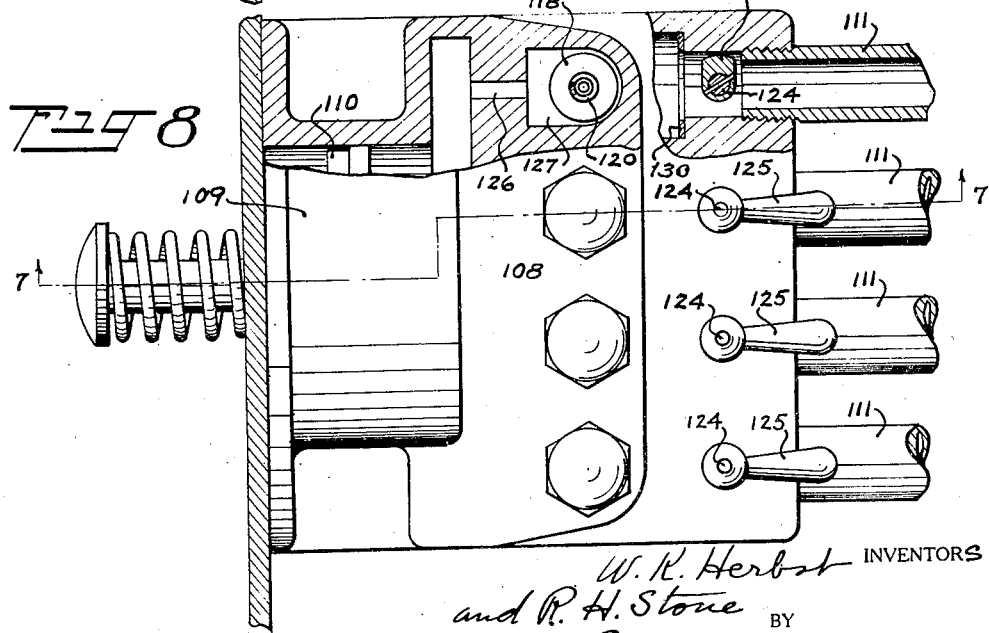
INVENTORS
W. K. Herbst
and R. H. Stone
BY
Thomas Howe ATTORNEY Patented Mar. 30, 1926.

1,578,824

UNITED STATES PATENT OFFICE.

WILLIAM K. HERBST, OF HILLSIDE, AND R. HARRY STONE, OF IRVINGTON, NEW JERSEY.

FLUID-OPERATED BRAKE.

Application filed April 18, 1924. Serial No. 707,389.

*To all whom it may concern:*

Be it known that we, WILLIAM K. HERBST and R. HARRY STONE, citizens of the United States of America, residing at Hillside, Union County, State of New Jersey, and Irvington, Essex County, and State of New Jersey, respectively, have invented new and useful Improvements in Fluid-Operated Brakes, of which the following is a specification.

This invention relates to brakes operated by pressure of fluid, such brakes being especially adapted for use in connection with four wheel brakes of automobiles and other vehicles, the fluid pressure being supplied by the action of the foot of the operator, from a suitable source of fluid pressure controlled by the operator or in any other suitable manner.

As usually constructed, the fluid pressure brakes for the different wheels of the vehicle have their pressure connections interconnected. This interconnection is advantageous as producing an equalization of pressure on the brakes of the different wheels With this arrangement, however, if the connection with one brake should become ruptured, gradually lose its fluid by a slow leak or lose its fluid in any way, all of the brakes so interconnected will be disabled and where, as is the usual arrangement, all of the brakes of the vehicle are interconnected, all braking control of the car will be lost.

It is the main object of the present invention to prevent the disabling of other of interconnected fluid pressure brakes upon the destruction or deterioration of the connections with one brake, the disablement being confined to the particular brake concerned, the other brakes remaining operative, this being accomplished in a system where a plurality of brakes are operated from the same pressure source so that the brake pressure may be equalized. Although it is believed that the invention will find its main useful application in connection with brakes as stated, it is to be observed that it will also be of use in connection with other fluid pressure systems wherein a plurality of devices are operated from the same source and it is desired to prevent the disabling of all of these devices upon the disablement of one of them, and in other applications also.

A further object of the invention is to provide means for adjusting the body of fluid acting upon the device operated, thereby to compensate for wastage of the fluid by slow leakage or in any other way.

A further object of the invention is to incorporate the means for permitting the application of fluid pressure but preventing disablement as above referred to, with a pump structure adapted to supply the fluid pressure.

Other and ancillary objects of the invention will appear hereinafter.

In the accompanying drawings which illustrate the invention—

Fig. 1 is a top plan view of so much of a chassis (many of the parts being removed for the sake of clearness) of an automobile as is necessary to an understanding of the application of the present invention;

Fig. 2 is a side elevation, partly in central section, on an enlarged scale, of the means for transmitting the fluid pressure to a brake but preventing the exhaustion of the system therethrough to the disablement of the other devices connected with the fluid source.

Fig. 3 is a top plan view of the chassis of an automobile, similar to Fig. 1 showing the application to an automobile of the braking system having a modified form of device for transmitting pressure to actuate a brake but preventing exhaustion of the fluid through the connections of that brake whereby the other brakes of the system would be disabled;

Fig. 4 is a top plan view of the device just referred to on an enlarged scale;

Fig. 5 is a central vertical section of the device shown in Fig. 4;

Fig. 6 is a plan view of an automobile chassis similar to Figs. 1 and 3 showing the application thereto of a fluid pressure brake system wherein the means for preventing the disablement of the system by a leak in one of the brake connections is embodied in the pump supplying the fluid pressure;

Fig. 7 is a central longitudinal section of the pump and device referred to as being incorporated in the system of Fig. 6, this view being on a large scale and taken on the line 7—7 of Fig. 8; and Fig. 8 is a view partly in top plan and partly in section on the line 8—8 of Fig. 7.

Referring to the drawings and first to

Figs. 1 and 2 inclusive, the front wheels 1 of the automobile mounted on the axle 2 are provided with fluid-pressure-operated brakes 3 and 4, the construction of such brakes being well-known in the art and they may here be of any suitable construction so that further details of them will not here be given.

The rear wheels 5 and 6 are mounted on an axle enclosed in the casing 7 which includes the portion 8 within which are housed the usual differential gears which transmit the power from the drive shaft 9 to the wheels. The wheel 6 is provided with a suitable fluid-pressure-operated brake 10 and similarly the other rear wheel 5 is provided with a similar fluid-pressure-operated brake 11.

A foot-operated or other suitable pressure cylinder or pump 12 forces the fluid with which the brake connections and cylinder 12 are filled to exert pressure upon the brakes.

In order to avoid exhausting of the fluid of the system so that the whole brake system may not be disabled upon rupture of one of the brake lines as before referred to, a device is placed in each of those lines, thus the pipe 13 has its connection established with the pressure cylinder 12 through pipe 14 by means of a suitable device 15 of the character referred to, similarly the brake pipe 16 is connected through the device 17 with the pipe 14, the brake pipe 18 is connected through the device 19 with the pipe 14 directly connected with the pressure cylinder 12 and the brake pipe 20 is connected through the device 21 with the pipe 14. It will be understood that the pipes referred to may be of any desired size, material and construction and may be rigid or flexible in whole or in part as may be necessary or desirable. The devices 15, 17, 19 and 21 are exactly alike and as illustrated in Fig. 2. This device of Fig. 2 comprises a cylinder 22 within which slides a piston 23 pressed by a spring 24 toward the pressure end of the cylinder which is provided with a fitting 25 to which a pipe 26 leading to the pressure cylinder is connected. At the other end of the cylinder 22 is a fitting 27 to which the pipe 28 leading to the brake is secured. Extending between the fittings 25 and 27 and communicating with the ends of the cylinder 22 is a by-passage 29 controlled by the cock 30. Normally the cock 30 is closed and the system is filled with a fluid which may be a liquid such as oil, the liquid being incompressible and so acting promptly to transmit pressure from the pressure cylinder to the brakes. When, therefore, the pressure is applied to the pressure cylinder 12, the pressure is transmitted through the pipes and into the cylinder 22 against the left-hand side (see Fig. 2) of the piston 23 which in turn exerts the pressure upon the body of fluid upon the right-hand of the piston 23, which last body of fluid extends to the brake so that the pressure exerted in the pressure cylinder is transmitted to the brake, the piston 23 floating, as it were, between the two bodies of fluid. Should the pipe 28 or any of its connections with the brake become broken, the fluid upon the brake side of the piston 23 may become exhausted and except for the interposition of the piston 23 all of the fluid might be exhausted from the pressure cylinder and its connections when an attempt was made to apply the brakes by creating pressure within the pressure cylinder. With the arrangement shown, however, a rupture of the brake line between the piston 23 and the brake would simply result in exhaustion of the fluid on the brake side of the piston 23, the pressure cylinder and its connections retaining their charge of fluid. When pressure was applied on the pressure cylinder, the pressure applied to the left-hand side of the piston 23 would simply cause it to move to the right-hand end of the cylinder 22 when it would be checked and block further flow of the fluid from the compressor and its connections.

The space from the piston 23 in the piping and brake connections, as has been before stated, should be substantially full of the fluid employed to transmit the pressure and should this fluid become depleted by a slow leak or in any other way, the deficiency may be made up by opening the cock 30 when fluid will flow about the piston 23 into the connections on the brake side so that they may become substantially filled, and any pressure necessary or desirable to accomplish this may be applied by means of the pressure cylinder.

After such filling has been accomplished it is apparent that the piston 23 should be at some distance from the brake end of the cylinder 22 so that it may have movement in transmitting the brake operating pressure. The by-pass being open, the pressure on the two sides of the piston will be equalized whereupon the spring 24 may operate to throw the piston to the left as indicated in Fig. 2. The desired replenishment of the fluid on the brake side of the piston having been accomplished, the cock 30 may be closed, when the brake line will operate as before, transmitting the pressure from the pressure cylinder 12 as it may be caused to any greater or less degree by the pressure of the operator's foot, to the brake.

It will be seen from the foregoing that the brakes are operated by fluid connection from a common source of fluid pressure whereby the brake pressures are equalized and at the same time provision is made whereby, upon failure or breakage of any one brake line, the pressure and fluid of the remainder of the brakes and system will be conserved so that only the particular brake line affected will be put out of operation. The disastrous consequences of all of the brakes being disabled upon failure of one of them is obvious.

Referring now to Figs. 3, 4 and 5, the construction of the wheels, brakes, etc., is the same as described in connection with the structure of Figs. 1 to 3 inclusive.

The well-known construction of foot-operated-pressure cylinder or pump 50 is adapted to apply pressure through the pipe connections 51, 52, 53 and 54 to the fluid-pressure-operated brakes 55, 56, 57 and 58 respectively in the well-known manner. In the brake connections, however, are inserted devices 59, 60, 61 and 62 which are adapted to transmit pressure but prevent disabling exhaustion of the fluid from the remainder of the system. The structures of each of these devices 59 to 62 inclusive may be best described in detail in connection with the enlarged views of Figs. 4 and 5. Referring now to these views the device comprises a cylinder 63 having a head 64 and within which slides a piston 65. Secured to the piston 65 is a smaller piston 66 reciprocating in the smaller cylinder 67 closed by the cap or head 68. A vent 69 is provided in the cap 68 to prevent hampering of the movements of the piston structure by tendency to form a vacuum.

Secured to the piston 65 is a sliding cam structure having depressions 70 and 71 and an elevation 72. A guide rod 73 fixed in the head 64 and sliding within a recess 74 in the piston structure surface guides and steadies that structure. A pipe 75 connected with the fluid-pressure source communicates with a chamber 76 in the cylinder casing and this chamber 76 communicates by a duct 77 with the space between the pistons 65 and 66. This passage 76 is also adapted to communicate with the chamber 78 in the cylinder 63 at the right-hand side of the piston 65 through a valve seat 79 against which is pressed the valve 80 by a spring 83, this valve having a stem 81 sliding in the lug 82 mounted on the head 64. The lower end of the stem 81 is adapted to be engaged by the cam surfaces 70, 71 and 72 to move the valve 80 away from or permit it to come into engagement with its seat. The chamber 78 is in communication with a pipe 84 leading to a brake.

With the parts in the position as shown, the valve 80 is closed, the end of its stem resting in the recess 71. This is the normal position of the apparatus, and it will be seen that the pipe 75 communicating with the source and interconnected with the other brakes is cut off from the pipe 84 so that the system will not be drained upon wastage of the fluid from the pipe 84. If now the pressure is applied by the cylinder 50, the pressure applied through the pipe 75 and into the cavity 76 will be prevented by the closed valve 80 from coming against the right-hand side of the piston 65. It will, however, extend through the passage 77 in between the pistons 65 and 66. There being therefore no pressure exerted against the right-hand side of the piston 65, the piston 65 will move to the right under the pressure upon its left-hand face (which pressure is not counterbalanced by the pressure on the smaller piston 66) whereupon the valve stem 81 will ride upon the valve face 72 and open the valve 80. This movement will be limited by the pressure coming through the valve seat 79 as the valve is opened and also by the filling up of the chamber 78 with the oil in the brake or secondary connections. When the pressure upon the right-hand face of the piston 65 has built up to equal that on the left-hand side, the piston 65 will move toward the left under the pressure on the right-hand face of the piston 66, the pressures on the two sides of the piston 65 neutralizing each other, and when this piston has moved into the position as shown in the drawing (Fig. 5) the valve stem will have again dropped into the notch 71 and the valve 80 will be closed. It can, however, open to permit the oil in the chamber 78 to flow back into the chamber 76 when the pressure of the cylinder is removed and the brakes come off.

If in the right-hand movement of the pistons as before referred to, the pressure is not built up on the right-hand side of the piston 65 as would be occasioned if there were a rupture in the pipe 84, the pistons do not stop their right-hand movement until they have moved so far to the right that the valve stem 81 will ride off the face 72 down into the notch 70 and the valve thus becomes closed. Thus wastage of fluid from the pressure source is prevented on rupture of any of the brake connections. When this piston has moved as just described into its extreme right-hand position, it will be necessary to reset the apparatus after repair of the rupture and filling of the brake connections with oil, so that the stem 81 will move out of the notch 70 up on to the face 72. This may be accomplished by means of a pin 90 sliding in the head 64 and adapted at its inner end to bear against the end of the cam projection from the piston 65.

In Figs. 6 to 8 inclusive is shown a modified construction wherein the means for transferring pressure but preventing exhaust of the oil system upon rupture of a brake connection, is incorporated in the pressure cylinder structure. This has the important advantage that in addition to forming a compact structure, the fluid-checking and pressure-transferring devices are brought as close to the source of pressure as possible and therefore rupture in the longest line of brake connections is guarded against.

Referring now to these Figs. 6 to 8 inclusive, each of the brakes 100, 101, 102 and 103 which may be of any well known or suitable fluid-pressure-operated type are provided for the wheels of the vehicle, and from these brakes pressure connections 104, 105, 106 and 107 extend to the fluid-pressure cylinder 108 with which is incorporated the devices for transmitting the pressure but limiting fluid flow as will be now referred to in connection with Figs. 7 and 8.

Referring to these last figures, it will be seen that the pressure cylinder comprises a cylinder 109 within which slides the usual piston 110. Each of the brake pressure connections as 111 is in communication with the interior of a cylinder 112 (there being one for each brake connection) which opens into the pressure cylinder and within which slides a piston 113 having an extension upon which is carried the cam member comprising the depressed portions 114 and 115 and the elevated portion 116 which cooperate with the end of the stem 117 of a valve 118 adapted to be moved toward and away from its seat 119 and against which it is pressed by a spring 120. Secured to the cam projection from the piston is a secondary piston 121 which serves to steady the piston 113 and limit the movement of the piston and cam structure toward the right by coming against the end of the cylinder 114. The projection 122 beyond the piston 115 is adapted to project into the passage beyond the end of the cylinder so as to be engaged by a cam 123 fixed on a rotatable spindle 124 operated by means of a handle 125.

With the parts in the position shown the valve 118 is seated so that there can be no leakage from the pressure cylinder or any of the other connections communicating therewith into the chamber 114 and thence to the pipe 111 in case there should be any rupture of the brake connections communicating with the pipe 111. If it be desired to apply the brakes, the piston 110 will be driven toward the right (Fig. 7) thereby exerting pressure upon the left-hand face of the piston 113 and also through the passage 126 into the chamber 127. The valve 118 being closed this pressure will not be transmitted to the right hand side of the piston 113. This piston will, therefore, move toward the right, the valve stem riding upon the elevated surface 116 out of the lower position 115. This will cause the opening of the valve 118. Pressure is then admitted from the chamber 127 into the cylinder 112 between the pistons 113 and 121 and will equalize the pressure tending to move the cam as soon as the valve 118 has been opened sufficiently. The building up of the pressure in the brake line, however, on the right-hand side of the piston 121 will limit the movement of the cam to the right, the valve stem remaining upon the elevated surface 116. When the pressure is released the reaction of the brakes to the ordinary springs or other suitable devices will remove the shoes from the brake drums, acting along the oil in the brake line, will force the pistons and cam member to the left-hand, the valve stem will drop down on to the lower cam surface 115 and the valve 118 will close. This is the normal condition when the brake is not applied and, the valve 118 being closed, there is no chance of wastage from the pressure cylinder and the other brakes connected to it into the pipe 111 in case there should be any rupture of it or leakage from it.

The operation as before referred to will take place provided the brake and connections are intact. If, however, there is a rupture in the brake line or the oil as wasted therefrom through a slow leak or in other ways, when it is attempted to apply the brakes by placing pressure upon the piston 110 as before referred to, the piston 113 will encounter no opposition to its movement to the right until it has reached the extreme right-hand limit of its movement when the valve stem 117 after having ridden over the elevated portion 116 will drop down on to the lower portion 114 and the valve will close. It will thus be seen that in case of rupture or wastage of the fluid from the pipe 111 or its connections, the valve 118 cannot be maintained open so that the fluid cannot be exhausted from the pressure cylinder or its other connections. The piston and cam structure having been moved its extreme limit to the right as described, when, for any reason, fluid has wasted from the pipe 111 or its connections, it will be necessary to move the piston and cam structure to the left sufficiently to rest the stem upon the elevated surface 118 in order that the device may be reset for operation when the leakage has been repaired and the brake connections are refilled with oil. To accomplish this resetting the cam 123 is provided as has been before referred to. By turning the handle 125 the cam 123 will come against the end of the projection 122 and throw it toward the left, thereby resetting it as described, for a distance equal to the maximum radius of the cam. Several notches 128 and 129 are cut in the edges of the piston 121 whereby there may be normally a transfer of fluid to transfer the pressure from one side of the piston 121 to the other; but upon rupture or wastage of fluid from the connections 111 the piston will be forced into a tight seal with the gasket 130 so that communication through its notches is closed.

While the invention has been illustrated in what are considered its best applications it may have other embodiments without departing from its spirit and is not, therefore, limited to the structures shown in the drawings.

What we claim is :—

1. The combination with a fluid-pressure-operated brake, of a source of fluid under pressure, primary connections communicating with said source, secondary connections communicating with said brake and means permitting transfer of pressure between said primary and secondary connections but normally preventing any substantial flow of fluid therebetween, and a by-pass for permitting fluid flow between said primary and secondary connections.

2. The combination with a fluid-pressure-operated brake, of a source of fluid under pressure, primary connections communicating with said source, secondary connections communicating with said brake, means controlled by differences in pressure between said primary and secondary connections for permitting transfer of pressure but normally preventing any substantial flow of fluid between said primary and secondary connections, a by-pass between said primary and secondary connections and means for controlling said by-pass.

3. The combination with a fluid-pressure-operated brake, of a source of fluid under pressure, primary connections communicating with said source, secondary connections communicating with said brake, a cylinder communicating at one end with said primary connections and at the other end with said secondary connections, a piston in said cylinder and fitting said cylinder in a substantially fluid-tight manner, said piston being subjected to the fluid-pressure of the primary connections on one side and fluid-pressure of the secondary connections on the other side and adapted to be moved by differences of the pressures in said connections, a by-pass between said primary and secondary connections and means for controlling said by-pass.

4. The combination with a fluid-pressure-operated brake, of a source of fluid under pressure, primary connections communicating with said source, secondary connections communicating with said brake, a cylinder communicating at one end with said primary connections and a piston in said cylinder and fitting said cylinder in a substantially fluid-tight manner, said piston being subjected to the fluid-pressure of the primary connections on one side and fluid-pressure of the secondary connections on the other side and adapted to be moved by differences of the pressures in said connections, a spring for biasing the piston in one direction, a by-pass between said primary and secondary connections and means for controlling said by-pass.

5. The combination with a source of fluid under pressure, of a plurality of fluid-pressure-operated brakes, primary connections communicating with said source, a plurality of sets of secondary connections for said brakes respectively and means for connecting each of said sets of secondary connections with said primary connections, each of said means permitting transfer of fluid-pressure from the primary to the set of secondary connections controlled by said means but normally preventing any substantial flow of fluid therebetween, and means for establishing and dis-establishing fluid connections between said primary and secondary connections.

6. A fluid pressure transfer fitting comprising in combination a cylinder, a piston therein preventing passage of substantially all fluid through said cylinder, and a passage communicating with said cylinder on both sides of said piston and constituting a by-pass about said piston.

7. A fluid pressure transfer fitting comprising in combination a cylinder, a piston therein preventing passage of substantially all fluid through said cylinder, a passage communicating with said cylinder on both sides of said piston and constituting a by-pass about said piston and a valve in said passage.

8. A fluid pressure transfer fitting comprising in combination a cylinder, a piston therein preventing passage of substantially all fluid through said cylinder, a passage communicating with said cylinder on both sides of said piston and constituting a by-pass about said piston and a spring in said cylinder bearing against said piston.

9. A fluid pressure transfer fitting comprising in combination a cylinder, a fitting at each end of said cylinder and screw threaded thereto, each of said fittings also being screw threaded for pipe attachments, a piston in said cylinder and forming a substantially fluid-tight connection therewith, and a passage extending between said fittings.

10. A fluid pressure transfer fitting comprising in combination a cylinder, a fitting at each end of said cylinder and screw threaded thereto, each of said fittings also being screw threaded for pipe attachments, a piston in said cylinder, a passage extending between said fittings and a valve in said passage.

11. A fluid pressure transfer fitting comprising in combination a cylinder, a fitting at each end of said cylinder and screw-threaded thereto, each of said fittings also being screw-threaded for pipe attachments, a piston in said cylinder and forming a substantially fluid-tight connection therewith, a passage extending between said fittings and a spring in said cylinder bearing against said piston.

12. A fluid pressure transfer fitting comprising in combination a cylinder, screw-threaded connections for attaching said cylinder to pipes, a piston in said cylinder and a by-passage communicating with said cylinder and forming a substantially fluid-tight connection therewith on both sides of said piston.

In testimony whereof we have signed this specification this 8th day of April 1924.

WILLIAM K. HERBST.
R. HARRY STONE.